US010305950B2

(12) United States Patent
Chen et al.

(10) Patent No.: US 10,305,950 B2
(45) Date of Patent: May 28, 2019

(54) AGENT-BASED PASSIVE STREAMING

(71) Applicant: Verizon Patent and Licensing Inc., Arlington, VA (US)

(72) Inventors: Guanrao Chen, Sudbury, MA (US); Jian Huang, Sudbury, MA (US); Susan Kelly, Maynard, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 448 days.

(21) Appl. No.: 15/049,273

(22) Filed: Feb. 22, 2016

(65) Prior Publication Data

US 2017/0244771 A1 Aug. 24, 2017

(51) Int. Cl.
*G06Q 30/02* (2012.01)
*H04L 29/06* (2006.01)

(52) U.S. Cl.
CPC ..... *H04L 65/4084* (2013.01); *G06Q 30/0273* (2013.01); *G06Q 30/0277* (2013.01); *H04L 65/1069* (2013.01); *H04L 65/80* (2013.01)

(58) Field of Classification Search
CPC . H04L 65/4084; H04L 65/1069; H04L 65/80; G06Q 30/0273; G06Q 30/0277
See application file for complete search history.

(56) References Cited

U.S. PATENT DOCUMENTS

| 7,840,645 | B1* | 11/2010 | Chase | H04L 67/2814 |
| | | | | 709/217 |
| 2002/0010757 | A1* | 1/2002 | Granik | G06F 17/30876 |
| | | | | 709/218 |
| 2017/0142264 | A1* | 5/2017 | Moon | H04M 15/8083 |
| 2017/0237822 | A1* | 8/2017 | Kahn | H04L 67/20 |
| | | | | 709/206 |

* cited by examiner

*Primary Examiner* — Philip J Chea
*Assistant Examiner* — Robert B McAdams

(57) ABSTRACT

A native content handler in a user device, such as a smart phone, determines whether requested content may by delivered using special handling, such as prioritized or sponsored access. A listener of the content handler determines whether special handling may possibly be applicable to the content, and the listener modifies a universal resource locator (URL) associated with the content to mark the URL. An agent portion of the content handler exchanges data with a validation device to determine whether the user device is actually eligible to receive the content with the special handling. If the user device is eligible, the agent uses data provided by the validation device to obtain the content using the special handling.

16 Claims, 7 Drawing Sheets

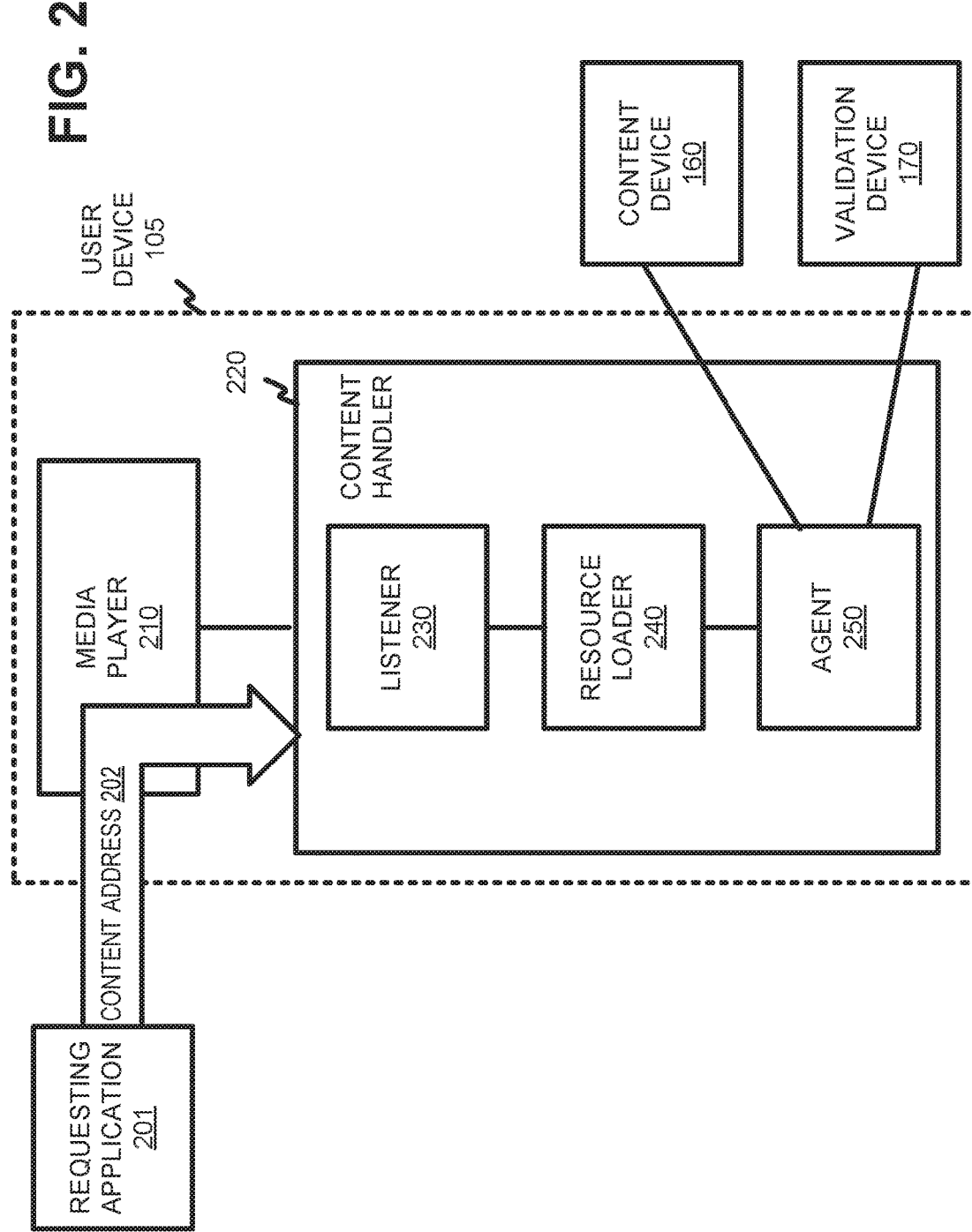

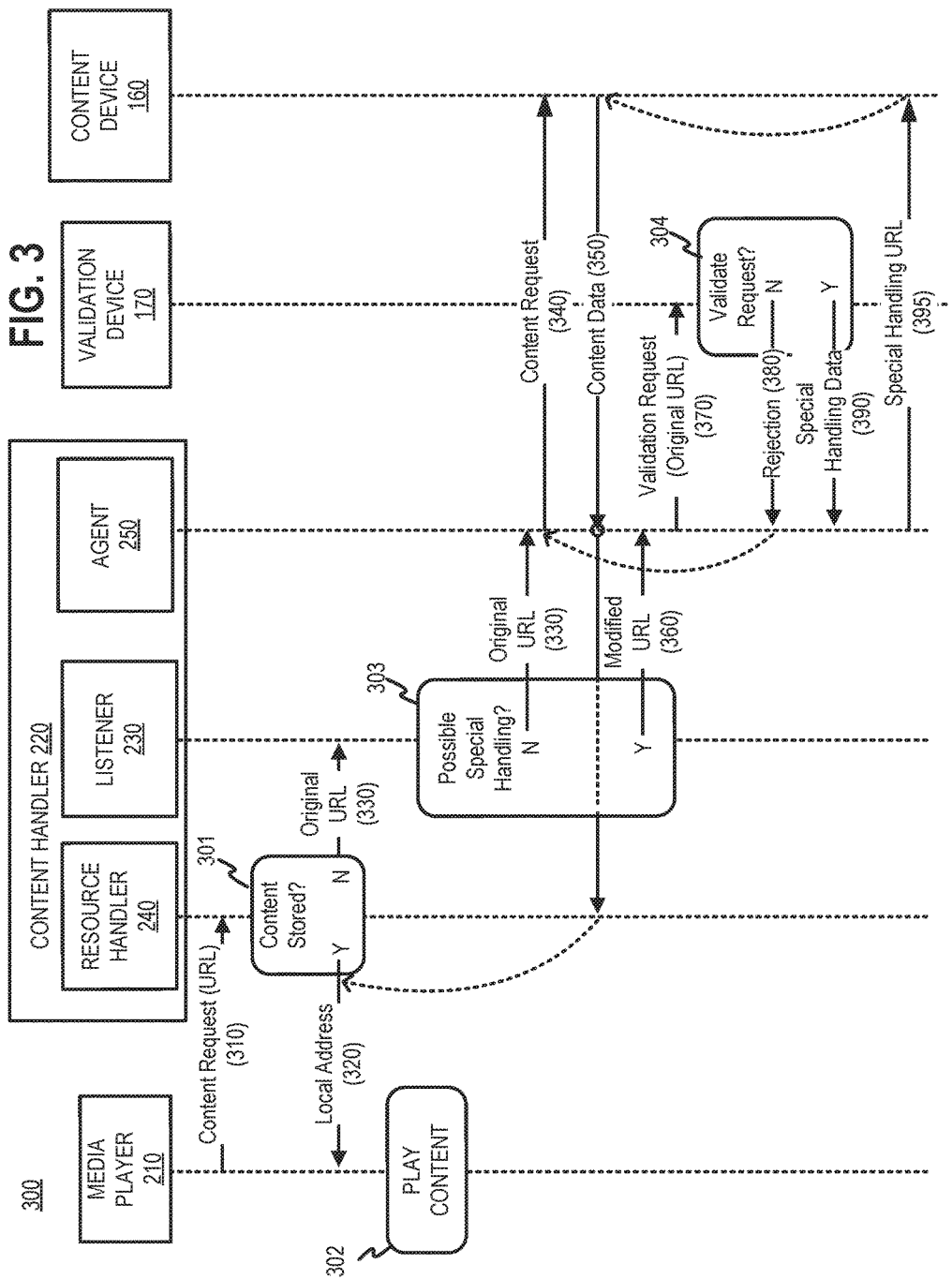

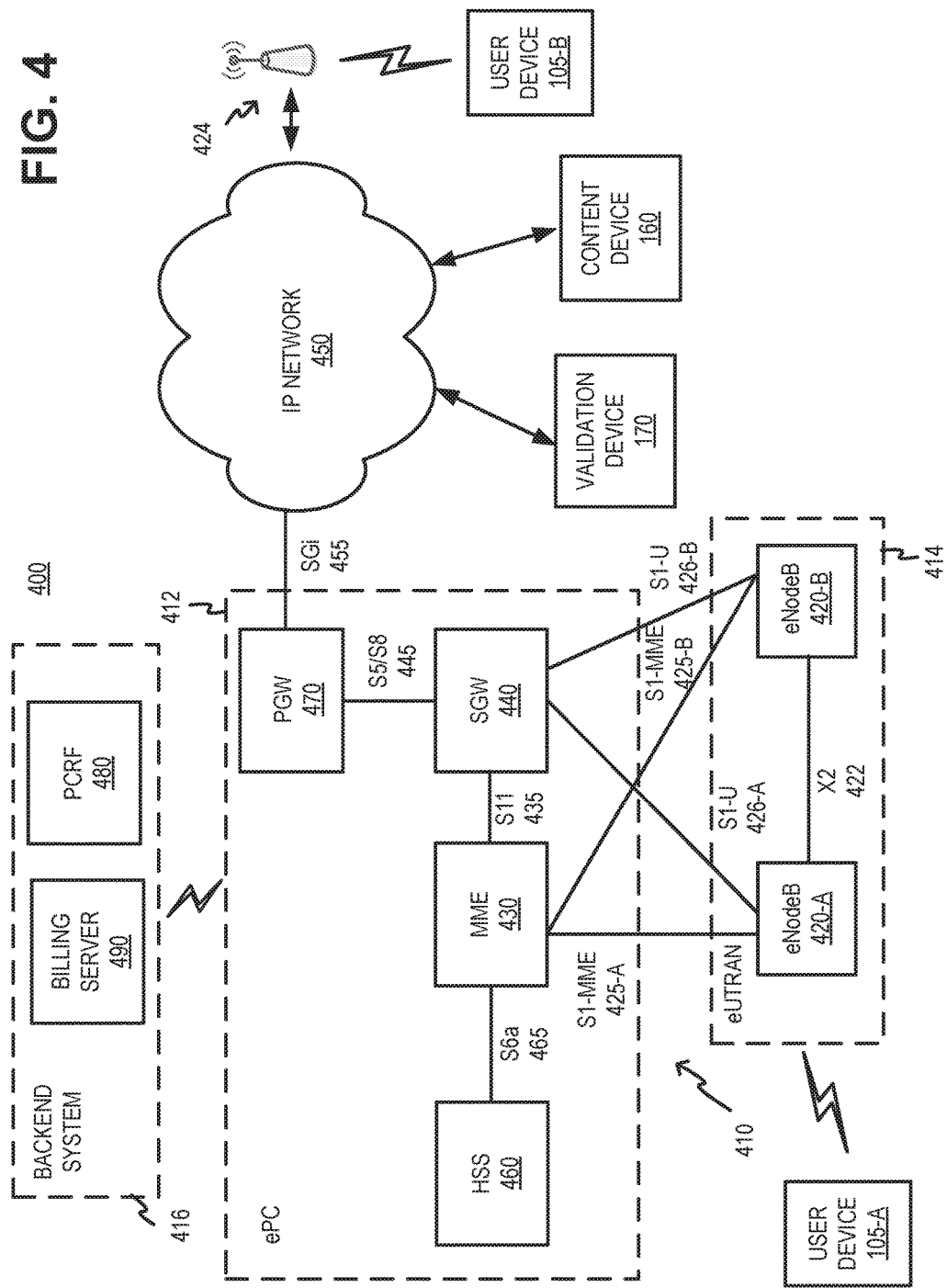

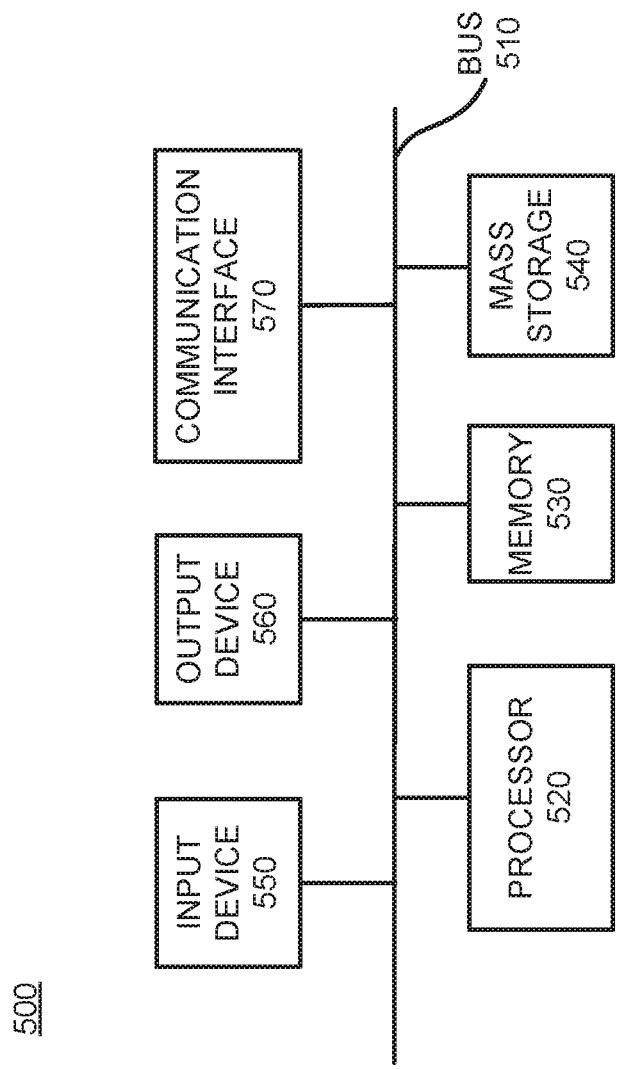

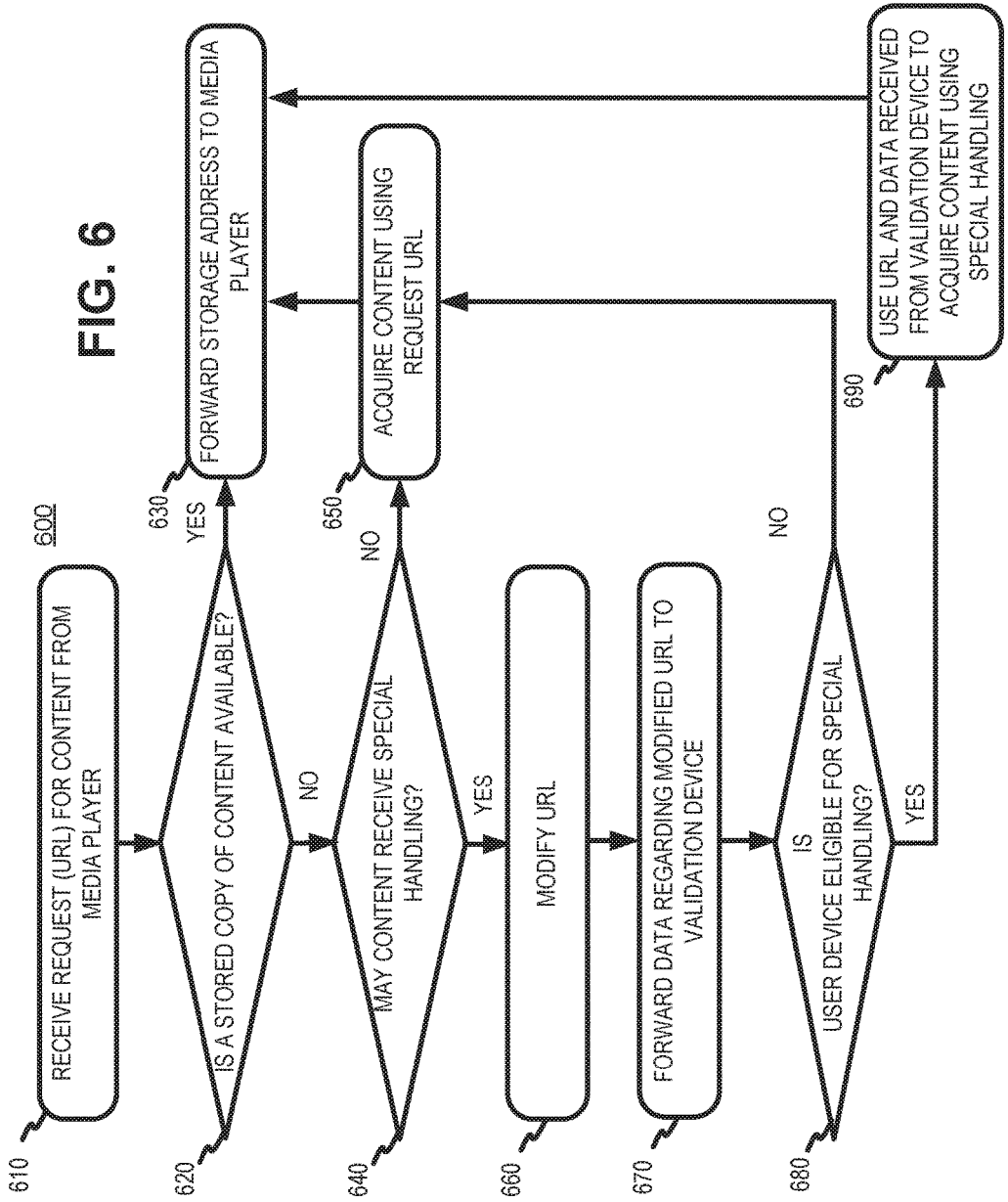

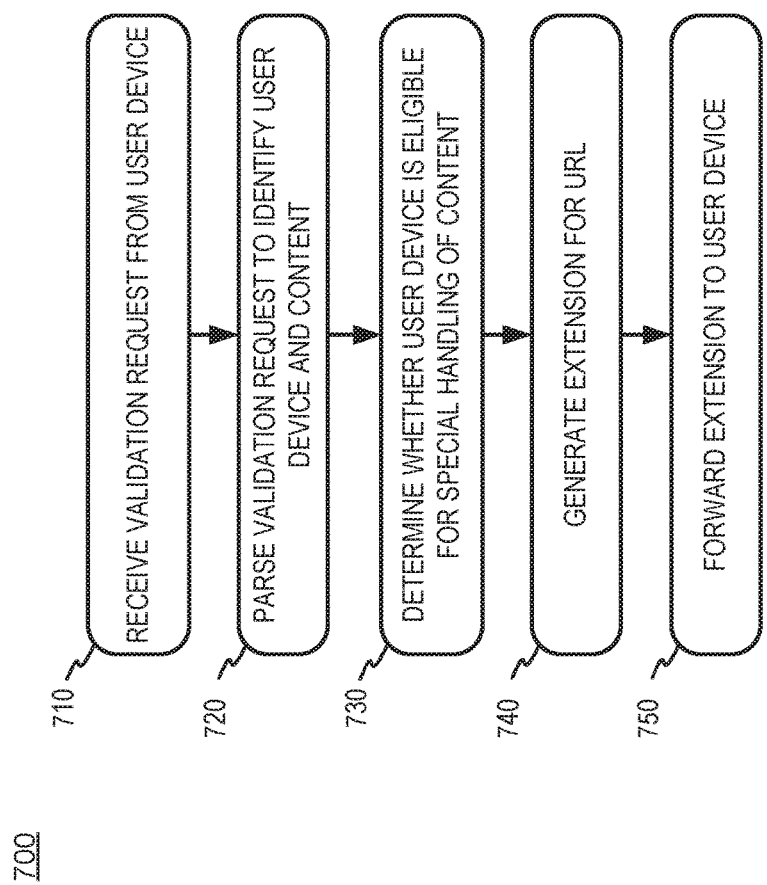

AGENT-BASED PASSIVE STREAMING

BACKGROUND

A user device, such as a computer, tablet, or smart phone, may access various content (e.g., web pages, multimedia content, programs, services, etc.) via a service network. For example, the user device may correspond to a mobile device that communicates via a wireless data and communications network, such as a wireless wide-area network (WWAN). In certain instances, the service network may use conventional handling procedures when providing certain content to the user device at certain times, and the service network may use different, special handling procedures when delivering the content at other times or when delivering other content. In one example, the service network may transmit certain content using a specialized network path that provides certain performance attributes (e.g., desired levels of bandwidth, delay, jitter, packet losses, etc.). In another example, the service network may transmit content using a different protocol, priority (e.g., quality of service priority) and/or access fees. User access to wireless communication networks and data services typically involves some form of payment made to a service network provider, but in some instances, a third party (e.g., a content provider) may sponsor a user's data consumption in order to entice user engagement.

BRIEF DESCRIPTION OF THE DRAWINGS

FIG. 2 is a schematic diagram showing exemplary components of a user device included in the environment shown in FIG. 1;

FIG. 3 is a diagram depicting an exemplary message flow between selected devices within the network environment shown in FIG. 1 to selectively provide special handling of content;

FIG. 4 is a block diagram of an exemplary wireless environment for providing special handling of content;

FIG. 5 is a is a block diagram showing exemplary components of a computing device included in the environments of FIG. 1 or 4 according to an embodiment;

FIG. 6 is a flow chart showing an exemplary process for selectively providing special handling of content; and FIG. 7 is a flow chart showing an exemplary process for determining whether a user device of the environment in FIG. 1 is eligible for special handling of content.

DETAILED DESCRIPTION OF THE PREFERRED EMBODIMENTS

Figure 1:
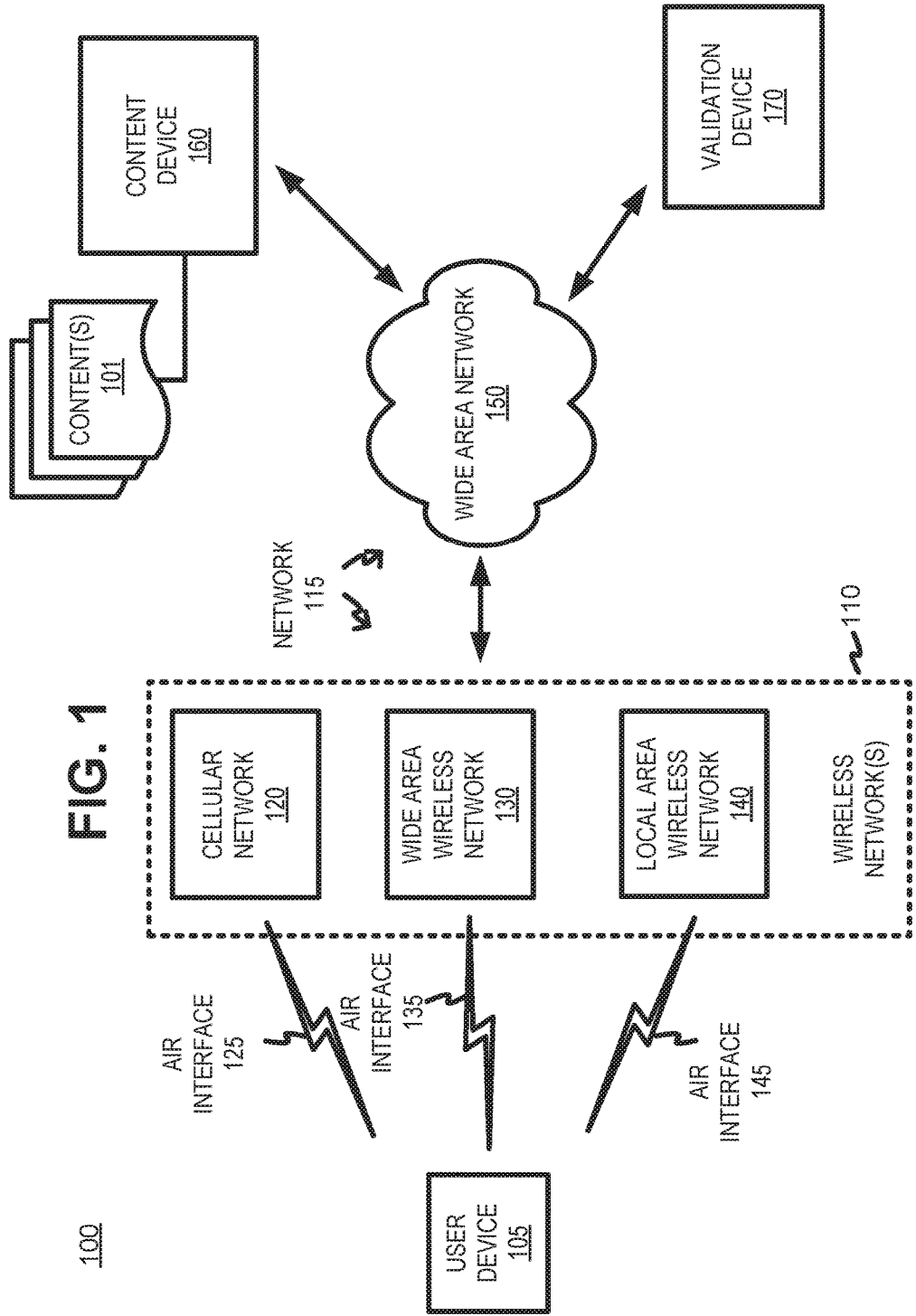
FIG. 1 is a block diagram of an exemplary environment for providing special handling of content.

The following detailed description refers to the accompanying drawings. The same reference numbers in different drawings may identify the same or similar elements. The following detailed description does not limit the invention.

Certain embodiments described herein are directed to modifying native operations within a user device, such as a smart phone, to perform operations related to selectively using special handling when obtaining remote content. The special handling may relate to the delivery of content, such as transmitting the content along a specialized path that provides certain performance attributes (e.g., certain levels of bandwidth, delay, jitter, packet losses, etc.) and/or a path that includes a specific node. In another example, the special handling may relate to sponsored data services (also referred to herein as a "toll free data service") in which access to a content by the user device is financially supported by a third party entity. The third party entity, hereinafter referred to as a "sponsor," subsidizes the network data exchanged between a user device and a specified content provider. The sponsor may have a relationship with the network provider that permits the automatic billing of the sponsor for the exchanged data, instead of the user of a user device. Thus, the data exchanged through the sponsored data services (which may also be referred to herein as "sponsored data" or "sponsored content") is effectively "toll-free" as seen by the user of the user device.

FIG. 1 is a block diagram of an exemplary environment 100 for selectively providing special handling of content 101. Environment 100 may include, for example, a user device 105; a network 115 that includes one or more wireless network(s) 110, such as a cellular network 120, a wide area wireless network 130, and/or a local area wireless network 140 that may be accessed via air interfaces (or "wireless channels") 125, 135, and/or 145, and a wide area network 150; a content device 160, and a validation device 170.

As shown in FIG. 1, user device 105 may obtain access to network 115 through wireless network(s) 110 over any type of known radio channel. For example, user device 105 may access cellular network 120 over wireless channel 125. Access over wireless channel 125 may be provided through a base station, eNodeB, etc., within cellular network 120, as will be described in more detail below in reference to an embodiment shown in FIG. 3. In various embodiments, cellular network 120, wide area wireless network 130, and/or local area wireless network 140 may communicate with one another. User device 105 may also access network 115 over wireless channel 135 through wide area wireless network 130. Wide area wireless network 130 may include any type wireless network covering large areas and may include a mesh network (e.g., IEEE 801.11s) and/or or a WiMAX IEEE 802.16. User device 105 may access network 115 over wireless channel 145 through local area wireless network 140, which may include WiFi (e.g., any IEEE 801.11x network, where x=a, b, g, n, ac, ah, etc.). The wireless network(s) 110 may exchange data with wide area network 150 that may include backhaul networks, backbone networks, and/or core networks. Content device 160 and/or validation device 170 may interface with wide area network 150, and thus with user device 105 over one or more of the air interfaces 125, 135, 145 through wireless network(s) 110.

User device 105 may obtain special access to network 115 over one or more air interfaces 125, 135, and/or 145. For example, a sponsor may support access of the user device 105 to certain data (e.g., content 101) provided by content device 160 through the air interfaces. In another example, user device 105 may access content 101 in a different manner (e.g., via a different path, a different network priority, a different protocol, etc.) than normally available in network 115 to user device 105. Content 101 (also be referred to herein as "media") may include any type of digital data representing user-interpretable information, including text, image, audio, and/or video data. The media may also include one or more combinations of any type of digital data that may be arranged, composited, and presented to the user, such as, for example, in the form of webpages in hyper-text markup language (HTML).

Wireless network(s) 110 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Referring to FIG. 1, user device 105 may be an electronic device having communication capabilities. User device 105 may communicate over network 115 using a variety of different channels, including wired and wireless connections. User device 105 may include, for example, a cellular radiotelephone, a smart phone, a wearable computer (e.g., a wrist watch, eye glasses, etc.), a tablet, a set-top box (STB), a mobile phone, any type of IP communications device, a voice over internet protocol (VoIP) device, a laptop computer, a palmtop computer, a gaming device, a media player device, or a digital camera that includes communication capabilities (e.g., wireless communication mechanisms).

User device 105 may download content 101 by making network requests using a network address associated with content device 160. The network address may be provided as part of an HTML page (e.g., hosted at a site). The HTML page, for example, may include a hyperlink (or "link") or other input element that may be selected by user device 105 to access content 101. The hyperlink may correspond to a uniform resource locator (URL) identifying a network address of content 101. Although shown as being provided by content device 160, it should be appreciated that content 101 may be indirectly accessed through other content device (not shown) associated with other content providers, data hosting services, application servers, etc.

To enable special handling of data and/or services (e.g., sponsored access via one or more portions of network 115), a URL for accessing the content may include data to enable the special handling. For example, a URL associated with content 101 may include an extension that identifies the special handling (e.g., priority routing, sponsored access, etc.) and data that enables special handling of content 101 within environment 100. For example, requests for sponsored content may be intercepted by network devices in backend infrastructure (not shown) which are responsible for tracking downloaded toll free data and billing sponsors for the cost of transmitting the data.

As described in greater detail below, user device 105 may be adapted to support the special handling of content 101. For example, user device 105 may perform certain operations and/or interface with other components (e.g., validation device 170) to download sponsored or other specially handled content by making network requests that include an appropriately signed network address for content 101. For example, if the special handling relates to toll-free access to content 101, the network requests may be intercepted by the service provider's existing backend infrastructure, which may track downloaded data and bill a sponsor for the cost of the data used by the campaign.

Content device 160 may be a network device (e.g., a web server, computer, media repository, streaming source, etc.) that may provide access to content 101. For example, a signed network address may be provided via a link to sponsored or other specially handled data that is hosted locally on content device 160 or remotely on another device.

Validation device 170 may be a cloud-based application server associated with network 115. Validation device 170 may determine, based on information received from user device 105, whether special handling should be used by network 115 when forwarding content 101 to user device 105. For example, user device 105 may forward information identifying content 101 and user device 105, and validation device 170 may interact with backend components of network 115 to determine whether user device 105 is associated with a customer type (e.g., a residential consumer versus a business customer), a geographic location, a device type (e.g., a device compatible with the special handling), etc. that is eligible to receive special handling of content 101. Validation device 170 may then forward a validation reply to user device 105. The validation reply may include, for example, a modified (e.g., "signed") URL or network address for content 101. For example, the modified URL may include an extension or other data that indicates that user device 105 has been authorized to receive content 101 using special handling within network 115. In this way, user device 105 may be evaluated with respect to content 101 using an identifier and/or other potentially confidential information without sharing this information with content device 160 or a third party not associated with network 115.

The number of devices and/or networks, illustrated in FIG. 1, is provided for explanatory purposes only. In practice, additional devices and/or networks, fewer devices and/or networks, different devices and/or networks, or differently arranged devices and/or networks than those illustrated in FIG. 1 may be used. Also, in some implementations, one or more of the displayed devices or networks may perform one or more functions described as being performed by another one or more of the other devices or networks. The devices and networks shown in FIG. 1 may interconnect via wired connections, wireless connections, or a combination of wired and wireless connections.

FIG. 2 is a schematic diagram showing exemplary components of user device 105. As shown in FIG. 2, user device 105 may include a media player 210 and a content handler 220 that, in turn, may include a listener 230, a resource loader 240, and an agent 250. It should be appreciated that the depicted components of user device 105 may be embodied in software and, thus, may be stored within a memory or a storage device. However, in other implementations, one more of media player 210, listener 230, resource loader 240, or agent 250 may be embodied in hardware, or in a combination of hardware and software.

In certain implementations, media player 210 and components of content handler 220 may be "native" to user device 105. For example, media player 210 and/or components of content handler 220 may be embodied in dedicated hardware included in user device 105 and/or incorporated through code included in the operating system (OS) of user device 105. As described in greater detail below, native components of content handler 220 may be adapted to support and enable specialized handling. Such adapted native hardware/software in user device 105 provide processing, memory and/or power usage efficiencies, in comparison to using non-native middleware on user device 105 for the special handling of content 101.

In one implementation, content handler 220 may be implemented as an abstract class adapted to acquire and provide media to media player 210. In general, a "class" is a template used to create objects and to define object data types and methods. Core properties of a class include the data types and methods that may be used by the object, and all class objects have common basic class properties. In this way, a class corresponds to a category, and class objects are items within the category. In programming, abstract classes contain one at least one abstract method, which is declared, but contains no implementation. Abstract classes may not be instantiated, and require defining subclasses that provide implementation details for the abstract methods.

For example, content handler 220 may be implemented in the iPhone® Operating System (iOS®) by Apple Inc. of Cupertino, Calif., using AVAsset. AVAsset is an abstract class used to represent timed audiovisual media, such as videos and sounds. The audiovisual media, in turn, may include a collection of media (or "tracks"), such as audio, video, text, closed captions, and subtitles, that are intended to be presented or processed together. The AVAsset class defines the collective properties of the tracks that comprise the asset.

In iOS, AVURLAsset is a concrete subclass of AVAsset used to initialize an asset based on an URL, such as content address 202 in FIG. 2. As described in greater detail below, an AVURLAsset may include, as agent 250, a programmable delegate that may be configured to perform various functions to enable the special handling of content 101 by user device 105. As described in greater detail below, the AVURLAsset delegate may be programmed to identify certain URLs (e.g., URLs flagged for having particular handling protocols), exchange data with validation device 170 to determine whether user device 105 is eligible for the special handling, and use data from validation device 170 to acquire content 101 with the special handling.

Returning to FIG. 2, the rendering and playing of the media associated with content 101 may be performed by media player 210. For example, media player 210 may utilize various coder/decoder (codec) applications to process content 101. Content 101 media may be encoded for compression and/or error correction and may be encrypted for digital rights management (DRM) protection. Media player 210 may request content 101 based on receiving content address 202, associated with the content 101.

As shown in FIG. 2, media player 210 may receive content address 202 from a requesting application 201 included in user device 105. Requesting application 201 may correspond to a browser or other application that requests and uses content 101. Requesting application 201 provides a user interface so that the user of user device 105 can request various media included in content 101. Once the requested media is obtained and processed by media player 210, requesting application 201 may show the media related to content 101 to a user.

Content address 202 may include a network address for content device 170 providing content 101. Content address 202 may correspond to a universal resource locator (URL), also referred to as a universal resource identifier (URI), that enables media player 210 to access content 101 included in HTML webpages. Content address 202 may identify a transmission protocol for accessing content 101 via network 115. For example, content address 202 may specify that content 101 should be sent to user device 105 using hypertext transfer protocol (HTTP) or HTTP secure (HTTPS). Content address 202 may also include information, such as an extension, identifying the special handling for content 101. For example, content address 202 may identify certain desired transmissions characteristics (e.g., desired bandwidth, packet-drop, jitter, delay, etc. levels). Content address 202 may further include additional information that may be used to provide special handling of content 101 through network 115. For example, if the special handling relates to a sponsor for content 101, content address 202 may include information which identifies the sponsor, to be billed for providing content 101 via network 115 and/or for using special handling (e.g., improved transmission characteristics).

In certain instances, content address 202 may be included within files. For example, a group of related media may be identified in a file that includes metadata (e.g., media names, storage addresses, play order, etc.) associated with the media. For example, a group of streamed content (e.g., chapters of movie or songs in an album) may be identified in a Moving Picture Experts Group Audio Layer-3 URL (M3U, or "M3U8" when stored in unicode) metafile that stores a multimedia playlists in the form one or more URLs pointing to an online stream.

Content handler 220 may perform various operations, based on content address 202, to enable media player 210 to access content 101 via a special handling procedure. For example, when a media player 210 forwards content address 202 to request content 101, resource loader 240 may determine whether content 101 has already been downloaded to user device 105. If a copy of content 101 is stored on user device 105, resource loader 240 may obtain and forward a copy of content 101 to media player 210 for rendering.

If content 101 is not available to user device 105, content handler 220 may obtain content 101 and selectively use special handling. For example, listener 230 may identify if content address 202 includes an extension associated with special handling, such as data identifying desired transmission characteristics and/or a string that identifies a sponsor. In another example, listener 230 may determine characteristics of content 101 (e.g. a content type) and/or content device 160 (e.g., a geographic location, owner, etc.) and may determine whether to apply special handling based on the identified characteristics. If content address 202 is included in a file, listener 230 may parse the file to identify URLs included in the file for content 101. If listener 230 determines that user device 105 may be eligible to receive content 101 with special handling, listener 230 may mark or otherwise modify data in content address 202 for additional handling, to form a modified content address 202.

For example, listener 230 may modify or replace HTTP and/or HTTP protocol specifications in content address 202 (or a file containing content address 202) with a different protocol name associated with special handling (e.g., "special protocol"). For example, listener 230 may modify a URL in the form of "http://Address_String/extension" to read "XYZ://Address_String/extension." In this example, "XYZ" refers to a special protocol name that triggers additional processing by content handler 220, "Address-String" identifies a network address for content 101 (e.g., a network location for content device 160), and "extension" refers to additional data related to transmission of content 101. It should be appreciated that the designation of a "special protocol" in a modified content address 202, by listener 230, is not intended to refer to an actual transmission protocol, but an indication that certain URLs within content address 202 may need additional processing by one or more components of content handler 220. If listener 230 determines that content 101 should not receive special handling (e.g., the URL for content 101 would not include an extension for special handling, and listener 230 may forward an unmodified version of content address 202 to resource loader 240 and/or agent 250.

Agent 250 may receive content address 202 from listener 230 and may determine whether content address 202 includes a URL with a marking that indicates a special protocol. If content address 202 does not include the marking (e.g., the URL indicates delivery of content 101 using HTTP and/or HTTPS), agent 250 may use the received URL to obtain content 101 without any type of special handling. For example, agent 230 may form a session with content device 160 to receive content 101. When content 101 is received and stored at user device 105, agent 250 may generate a local address to the storage location and forward this local address to resource loader 240, to provide the stored version of content 101 to media player 210.

Alternatively, if agent 250 receives, from listener 230, a URL that includes the marking indicating a special protocol (e.g., the URL indicates delivery of content 101 using an artificial "XYZ" protocol in the above example), agent 250 may return the modified URL to its original form (e.g., to request delivery of content 101 using HTTP and/or HTTPS). Agent 250 may interface with validation device 170 to determine whether special handling should actually be applied. For example, agent 250 may forward data identifying the original URL and user device 105 to validation device 170. In response, validation device 1170 may determine whether user device 105 is eligible for the special handling. For example, the special handling may relate to delivery in a particular geographic region, and validation device 170 may determine whether user device 105 is located in the geographic region.

If validation device 170 determines that user device 105 is not eligible to receive content 101 using special handling, validation device 170 may forward a corresponding response. For example, validation device may respond to agent 250 with the original URL for content 101, and agent 250 may use this information to obtain content 101 without using special handing in the previously described manner.

If validation device 170 determines that user device 105 is eligible to receive content 101 using special handling, validation device 170 may forward additional data to user device, such as a different address for content 101 and/or a modification to the extension portion of the URL. For example, if the special handling relates to the sponsored for content 101, the modified extension may identify a sponsor to be billed for the access. Agent 250 may then use the data received from validation device to obtain content 101 using the special handling procedures. For example, agent 250 may initiate a session based on the modified URL received from validation device 170, and agent 250 may request delivery of content 101 via the established session. Additionally or alternatively, agent 250 may forward the data received from validation server 170 (e.g., data identifying a sponsor), and one or more components of network 115 may provide the special handling of content 101 based on the received data. Once agent 250 obtains content 101, media player 210 may access content 101 through resource loader 240.

The components of user device 115 illustrated in FIG. 2 are provided for explanatory purposes only. In practice, user device 105 may include additional components, fewer components, different components, or differently arranged components than those illustrated in FIG. 2. Also, in some implementations, one or more of the displayed components may perform one or more functions described as being performed by another one or more of the components of user device 105.

FIG. 3 is an exemplary message flow diagram 300 that relates to selectively using special handling for content 101. More specifically, as shown in FIG. 3, messages flow between media player 210, listener 230, resource handler 240, agent 250, content device 160, and validation device 170 within the network environment shown in FIG. 1.

As shown in FIG. 3, media player 210 may forward a content request 310 that includes an identifier (e.g., a URL) for content 101. Content request 310 may include a network address associated with a storage location for content 101. For example, content request 210 may include a network address for content device 160 (or another device providing content 101) and other information (e.g., transmission protocol, pathway, a port, memory portion, file name, etc.) associated with accessing content 101 through content device 160. Content request 310 may also include information associated with media player 210, such as information identifying a compatible format.

As shown in FIG. 3, web page request 210 may be intercepted by components of content handler 220. Resource handler 240 may determine whether content 101 is stored within user device 101 or at a location that differs from content device 160 (block 301). For example, resource handler 240 may determine when content 101, corresponding to the URL identified in content request 310, was previously obtained and cached in a memory associated with user device 105. If content 101 is stored by user device 105 (block 301—Yes), resource handler 240 may forward a local address 320 (e.g., a memory location) associated with stored version of content 101, and media player 210 may obtain and play content 101 (block 302).

If a copy of content 101 is not stored by user device 105 (block 301—No), the original URL 330 for content 101 may be intercepted and processed by listener 230 to determine whether special handling may possibly be used for providing content 101 (block 303). In block 303, listener 230 may evaluate original URL 330 to determine if it includes data (e.g., an extension) indicating that special handling should be applied. For example, if the special handling relates to a sponsor, listener 230 may determine whether the original URL 330 includes an extension or other data identifying the sponsor (i.e., one that assumes the costs for delivering content 101 via network 115). If special handling is not used for providing content 101 (block 303—No), listener 230 may forward the original URL 330 to agent 250 to obtain content 101 using regular (e.g., non-special) handling procedures. For example, agent 250 may forward a content request 340, based on original URL 330, to content device 160, and content device 160 may forward, as content data 350, content 101 to agent 250. Agent 250 may store content data 350, and resource handler 240 may forward local address 320 to media player 210 to enable media player 210 to access and play the stored content 101.

If special handling is to be used for providing content 101 (block 303—Yes), listener 230 may generate a modified URL 360 and forward modified URL 360 to agent 250. To generate modified URL 360, listener 230 may replace, in original URL 330, data identifying a protocol for forwarding content 101 with data identifying a different protocol and/or user device 105. For example, listener 230 may replace information identifying HTTP and/or HTTPS in original URL 330, to specify an artificial protocol.

Agent 250, based on receiving modified URL 360, may use the original URL 330 (e.g., with the original transmission protocol) to forward a validation request 370 to validation device 170. Validation request 370 may include data identifying content 101 (e.g., a portion of original URL 330) and/or data for user device 105, such as a network address associated with content 101, an identifier or a user, etc.

Validation device 170 may validate user device 105 with respect to special handling of content 101 (block 304). For example, validation device 170 may determine whether user device 105 is eligible to receive special handling of content 101 through network 115. In one example, validation device 170 may use the identifying information for user device 105, as included in validation request 370, to interface with backend components of network 115 to obtain additional information regarding user device 105 and/or a user associated with user device 105. For example, validation device 170 may determine a device type, compatible transmission protocols, a geographic location, account data, etc. associated with user device 105. Validation device 170 may then apply logical rules associated with special handling of content 101. For example, the logical rules may indicate that special handling (e.g., sponsored access) of content 101 may be applied when user device 105 is associated with a specific type of customer (e.g., a residential customer) in a specific geographic location.

If validation device 170 determines that user device 105 is not eligible to receive special handling of content 101 based on validation request 370 (block 304—No), validation device 170 may forward a rejection message 380. Rejection message 380 may not include data associated with special handling of content 101, such as original URL 330. Otherwise, if validation device 170 determines that user device 105 is eligible to receive special handling of content 101 based on validation request 370, validation device 170 may forward special handling data 390. For example, validation device 170 may modify (e.g., sign) the URL for content 101 and forward, as special handling data 390, the modified URL to user device 105. For example, validation device 170 may append an extension to the URL for content 101 and may forward the modified URL to user device 105. The extension may include a specific string (e.g., of alphanumeric characters) that indicates special handling procedures should be used when forwarding content 101 to user device 105. Special handling data 390 include data identifying the modified (or signed) URL for content 101. Modified URL message 240 may further include code or script that causes user device 105 to be redirected to content device 160 using the modified URL. For example, the script in modified URL message 240 may cause user device 105 to forward the modified URL, as special handling URL 395, to content device 160 to request content 101. Content device 160 may, based on receiving special handling URL 395, forward content data 350 to agent 250 using the special handling procedures. For example, content device 160 may establish a session based on the special handling special handling URL 395 with content device 160 to cause content to user device 105 to send content 101 over the session.

While FIG. 3 shows exemplary messages in message flow diagram 300, in other implementations, message flow diagram 300 may include fewer messages, different messages, differently ordered messages, or additional messages than depicted in FIG. 3. Additionally, or alternatively, one or more messages in diagram 300 may include data described as being included in one or more other messages in message flow diagram 300.

FIG. 4 is a block diagram of an exemplary wireless networking system 400 that provides special handling of content 101 over various types of wireless channels. As shown in FIG. 4, wireless networking system 400 may include user device 105, a wireless network 410 which includes an evolved Packet Core (ePC) 412 and an evolved UMTS Terrestrial Network (eUTRAN) 414, a backend system 416, an Internet Protocol (IP) network 450, a WiFi wireless access point (WAP) 424, content device 160, and validation device 170.

Wireless network 410 may be a long-term evolution (LTE) network, and include one or more devices that are physical and/or logical entities interconnected via standardized interfaces. Wireless network 410 provides wireless packet-switched services and wireless IP connectivity to user devices to provide, for example, data, voice, and/or multimedia services. In this example, user device 105 (shown in FIG. 4 as user devices 105-A and 105-B) may correspond to user equipment (UE) adapted to communicate via wireless network 410 that corresponds to an LTE network. As shown in FIG. 4, ePC 412 may further include a mobility management entity (MME) 430, a serving gateway (SGW) device 440, a packet data network gateway (PGW) 470, and a home subscriber server (HSS) 460. The eUTRAN 414 may further include one or more eNodeBs 420-A and 420-B (herein referred to collectively as "eNodeBs 420" and individually as "eNodeB 420-x"). As further shown in FIG. 4, backend systems 416 may include a policy and charging rule function (PCRF) 480 and a billing server 490.

eNodeB 420 may include one or more devices and other components having functionality that allows user device 105 to wirelessly connect to eUTRAN 414. eNodeB 420-A and eNodeB 420-B may each interface with ePC 412 via a S1 interface, which may be split into a control plane S1-MME interface 425-A and a data plane S1-U interface 426. For example, S1-MME interface 425-A may interface with MME device 430. S1-MME interface 425-A may be implemented, for example, with a protocol stack that includes a Network Access Server (NAS) protocol and/or Stream Control Transmission Protocol (SCTP). S1-U interface 426-B may interface with SGW 440 and may be implemented, for example, using a General Packet Radio Service Tunneling Protocol version 2 (GTPv2). eNodeB 420-A may communicate with eNodeB 420-B via an X2 interface 422. X2 interface 422 may be implemented, for example, with a protocol stack that includes an X2 application protocol and SCTP.

MME device 430 may implement control plane processing for ePC 412. For example, MME device 430 may implement tracking and paging procedures for user device 105, may activate and deactivate bearers for user device 105, may authenticate a user of user device 105, and may interface to non-LTE radio access networks. A bearer may represent a logical channel with particular quality of service (QoS) requirements. MME device 430 may also select a particular SGW 440 for a particular user device 105. A particular MME device 430 may interface with other MME devices 430 in ePC 212 and may send and receive information associated with user devices 105, which may allow one MME device to take over control plane processing of user devices 105 serviced by another MME device, if the other MME device becomes unavailable.

SGW 440 may provide an access point to and from user device 105, may handle forwarding of data packets for user device 105, and may act as a local anchor point during handover procedures between eNodeBs 420. SGW 440 may interface with PGW 470 through an S5/S8 interface 445. S5/S8 interface 445 may be implemented, for example, using GTPv2.

MME device 430 may communicate with SGW 440 through an S11 interface 435. S11 interface 435 may be implemented, for example, using GTPv2. S11 interface 435 may be used to create and manage a new session for a particular user device 105. S11 interface 435 may be activated when MME device 430 needs to communicate with SGW 440, such as when the particular user device 105 attaches to ePC 412, when bearers need to be added or modified for an existing session for the particular user device 105, when a connection to a new PGW 470 needs to created, or during a handover procedure (e.g., when the particular user device 105 needs to switch to a different SGW 440).

HSS device 460 may store information associated with user devices 105 and/or information associated with users of user devices 105. For example, HSS device 460 may store user profiles that include authentication and access authorization information. MME device 430 may communicate with HSS device 460 through an S6a interface 465. S6a interface 465 may be implemented, for example, using a Diameter protocol.

PGW 470 may function as a gateway to IP network 450 through a SGi interface 455. IP network 450 may include, for example, an IP Multimedia Subsystem (IMS) network, which may provide voice and multimedia services to user device 105, based on Session Initiation Protocol (SIP). A particular user device 105, while connected to a single SGW 440, may be connected to multiple PGWs 470, one for each packet network with which user device 105 communicates.

Alternatively, instead of exchanging content 101 via ePC 412, user device 105 may exchange data with IP network 450 though WiFi wireless access point (WAP) 424. The WiFi WAP 424 may be part of a local area network, and access IP network 450 through a wired connection via a router. Alternatively, WiFi WAP 424 may be part of a mesh network (e.g., IEEE 801.11s). WiFi WAP 424 may be part of a local area network, or part of a wide area network (WiMaxx) or a mesh network (IEEE 801.11s).

As previously described, content device 160 may selectively apply special handling when forwarding content 101 to user device 105. For example, content device 160 may generate a session through a standard TCP/IP interface with IP network 450 and ePC 412 using SGi 455, and content device 160 may forward data associated with content 101 via the generated session. Communications between content device 160 and user device 105 may be performed through ePC 412 and eUTRAN 414 as shown for user device 105-A, or through WiFi WAP 425 as shown for user device 105-B. The communications between content device 160 and user device 105 may be channel agnostic, and thus may be performed using any known wireless and/or wired channels, or combinations thereof. Accordingly, other methods for communication between content device 160 and user device 105 may be used which are not illustrated in FIG. 4.

Validation device 170 may communicate with user device 105 via IP network 450. For example, validation device 170 may be associated with a cloud-based service for evaluating the eligibility of user device 105 to receive content 101 using special handling (e.g., sponsored access).

PCRF 480 may provide policy control decisions and flow based charging control functionalities. PCRF 480 may provide network control regarding service data flow detection, gating, quality of service (QoS) and flow based charging, etc. PCRF 480 may determine how a certain service data flow should be treated, and may ensure that user-plane traffic mapping and treatment are in accordance with a user's subscription profile. For example, PCRF 480 may identify and apply a user profile related to user device 105 when exchanging data using conventional handling procedures. In other instances, when landing content 101 is transmitted using special handling procedures, PCRF 480 may apply an alternative, different user profile (e.g., so content 101 forwarding to user device 105 with a different network priority, along a different path, using a different transmission protocol, using different security/encryption techniques, etc.).

Billing server 490 may store data identifying changes in services (e.g., based on receiving instructions from third-party data balance transfer system 110) and may modify user and device profiles, as applied by HSS 230 and/or PCRF based on the service changes. Billing server 490 may further determine and collect fees associated the requested service changes. For example, billing server 490 may charge a service fee to user device 105 for accessing content 101 when specialized (e.g., sponsored) data access is not authorized by validation device 170. Additionally, billing server 490 may be programmed to charge a sponsor, and not user device 105, for accessing content 101 when the sponsored data access is authorized by validation device 170 with respect to user device 105.

While FIG. 4 shows exemplary components of system 400, in other implementations, wireless networking system 400 may include fewer components, different components, differently arranged components, or additional components than depicted in FIG. 4. Additionally, or alternatively, one or more components of wireless networking system 400 may perform functions described as being performed by one or more other components of wireless networking system 400.

FIG. 5 is a block diagram showing exemplary components of a computing device 500 according to one implementation. As shown in FIG. 5, computing device 500 may include a bus 510, a processor 520, a memory 530, mass storage 540, an input device 550, an output device 560, and a communication interface 570. User device 105, components of user device 105 shown in FIG. 2, content device 160, validation device, or other devices illustrated in FIGS. 1 and 4 may each include one or more computing devices 500.

Bus 510 includes a path that permits communication among the components of computing device 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, processor 520 may be an x86 based CPU, and may use any operating system, which may include varieties of the Windows, UNIX, and/or Linux operating systems. Processor 520 may also use high-level analysis software packages and/or custom software written in any programming and/or scripting languages for interacting with other network entities are communicatively coupled to WAN 150.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read only memory (ROM) device or another type of static storage device, and/or a removable form of memory, such as a flash memory. Mass storage 540 may include any type of on-board device suitable for storing large amounts of data, and may include one or more hard drives, solid state drives, and/or various types of redundant array of independent disks (RAID) arrays.

Input device 550 may enable an operator to input information into computing device 500, if desired. Input device 550 may include, for example, a keyboard, a mouse, a pen, a microphone, a remote control, an audio capture device, an image and/or video capture device, a touch-screen display, and/or another type of input device. In some embodiments, computing device 500 may be managed remotely and may not include input device 550. Output device 560 may output information to an operator of computing device 500. Output device 560 may include a display (such as a liquid crystal display (LCD)), a printer, a speaker, and/or another type of output device. In some embodiments, computing device 500 may be managed remotely and may not include output device 560.

Communication interface 570 may include a transceiver that enables computing device 500 to communicate within network 115 with other devices and/or systems. The communications interface 570 may be configured to exchange data with WAN 150 over wired communications (e.g., conductive wire, twisted pair cable, coaxial cable, transmission line, fiber optic cable, and/or waveguide, etc.), or a combination of wireless. In other embodiments, communication interface 570 may interface with wide area network 150 using a wireless communications channel, such as, for example, radio frequency (RF), infrared, and/or visual optics, etc. Communication interface 570 may include a transmitter that converts baseband signals to RF signals and/or a receiver that converts RF signals to baseband signals. Communication interface 570 may be coupled to one or more antennas for transmitting and receiving RF signals. Communication interface 570 may include a logical component that includes input and/or output ports, input and/or output systems, and/or other input and output components that facilitate the transmission/reception of data to/from other devices. For example, communication interface 570 may include a network interface card (e.g., Ethernet card) for wired communications and/or a wireless network interface (e.g., a WiFi) card for wireless communications. Communication interface 570 may also include a universal serial bus (USB) port for communications over a cable, a Bluetooth® wireless interface, a radio frequency identification device (RFID) interface, a near field communications (NFC) wireless interface, and/or any other type of interface that converts data from one form to another form.

Computing device 500 may perform various operations, and computing device 500 may perform these operations in response to processor 520 executing software instructions contained in a computer-readable medium, such as memory 530 and/or mass storage 540. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of computing device 500, in other implementations, computing device 500 may include fewer components, different components, additional components, or differently arranged components than depicted in FIG. 5. Additionally, or alternatively, one or more components of computing device 500 may perform functions described as being performed by one or more other components of computing device 500.

FIG. 6 is a flow diagram showing an exemplary process 600 for selectively providing special handling of content 101. In one embodiment, process 600 may be performed by components of user device 105 depicted in FIG. 2. In other embodiments, one or more portions of process 600 may performed by one or more other components of environment 100 and/or wireless networking system 400, such as content device 160, validation device 170 and/or a component of network 115.

As shown in FIG. 6, process 600 may include content handler 220 receiving a request for content 101 from media player 210 (block 610), and determining whether a stored copy of content 101 is available on user device 105 (block 620). As previously described, the request may include a URL for content 101 If a stored copy of content 101 is available on user device 105 (block 620—Yes), resource handler 240 may forward a storage address for the stored copy of content 101 to media player 210 to enable media player 210 to access the stored copy of content 101 (block 630).

If a stored copy of content 101 is not available on user device 105 (block 620—No), listener 240 may determine whether content 101 may receive special handling (block 640). For example, listener 240 may determine whether the URL for content 101 includes data (e.g., an extension) indicating that special handling may be used. In another example, listener 240 may evaluate content 101 and determine whether contents 101 should receive special handling. For example, listener 240 may determine than content 101 includes multimedia content or other data that should receive special handling (e.g., routing through specific nodes within networking environment) to achieve desired transmission characteristics (e.g., transmission time, lag, bandwidth, jitter, packet drops, etc.) when forwarding content 101 to user device 105.

If content 101 may not receive special handling (block 640—No), listener 230 may leave the URL for content 101 unchanged, and agent 250 may obtain content 101 using the original URL (e.g., without special handling) (block 650). When listener 240 or another component of user device 105 reads the URL, it creates an instance of a URL object. The URL object is unchanged, used by agent 250 to obtain content 101 (block 630).

If content 101 may receive special handling (block 640—Yes), listener 230 may modify the URL for content 101 (block 660), and agent 250 may forward portions of the modified URL to validation device 170 (block 670). For example, listener 230 may mark the URL by modifying a transmission protocol (e.g., HTTP or HTTPS) included in the URL to a different protocol (e.g., a character string identifying an "artificial" protocol that is not actually used for transmission of content 101 but, instead, used to "mark" the URL for special handling. Agent 250 may identify the marked URL. Agent 250 may then recover the original URL (e.g., change back the changed protocols), and forward the original URL to validation device 170. Agent 250 may further forward, to validation device 170, information regarding user device 105, such as a device identifier (e.g., serial number, telephone number, network address, etc.), a geographic location, an user identifier (e.g., user name, account number, etc.), information regarding software and/or hardware in user device 105, etc. If a file (e.g., a playlist file, such as a .m3U8 file) includes multiple addresses (e.g., URLs) for different contents 101, listener 240 may rewrite the file to modify the multiple addresses within the file that are associated with special handling. Thus, a modified file may include certain URLs, associated with specially handled content 101, that are modified, while the file may also include other URLs, associated with conventionally handled data, which would be unchanged.

Agent 250 may determine whether user device 105 is eligible for special handling content 101 (block 680). As described in greater detail below with respect to FIG. 7, validation device 170 may determine whether special handling should be used when providing content 101 to user device 105. If validation device 170 determines that special handling should be used when providing content 101 to user device 105 (block 680—Yes), and validation device 170 may sign the URL (e.g., add an extension regarding the special handling) and may return the signed URL to user device 105. Agent 250 may then use the signed URL to acquire content 101 from content device 160 using special handling (block 690). For example, agent 250 may form a session based on the data received from validation device 170, and content device 160 may forward content 101 via the session. Otherwise, if validation device 170 determines that special handling should not be used when providing content 101 to user device 105 (block 680—No), and validation device 170 may return the unsigned URL (e.g., within modifying the extension), and agent 250 may obtain content 101 without using special handling (returning to block 650).

FIG. 7 is a flow diagram showing an exemplary process 700 for determining whether user device 101 is eligible to receive special handling of content 101. In one embodiment, process 700 may be performed by validation device 170. In other embodiments, one or more portions of process 700 may performed by one or more other components of environment 100 and/or wireless networking system 400, such as user device 105, content device 160, and/or a component of network 115.

As shown in FIG. 7, process 700 may include validation device 170 receiving validation data from user device 105 (block 710) and parsing the validation data to identify the URL for content 101 and user device 105 (block 720). For example, agent 250 may forward a validation request that includes information identifying user device 105 (e.g., a network address) and content 101 (e.g., a URL). The validation data may include further include additional information, such as that identifying location associated with user device 105, activities being performed by user device 105, hardware/software present on user device 105, etc.

Validation device 170 may determine whether user device 105 is eligible for special handling of content 101 (block 730). For example, validation device 170 may interface with a component of networking environment (e.g., PRCF 380 and/or billing server 390) to identify eligibility criteria for the special handling, and validation device 170 may determine whether user device 105 conforms to the eligibility criteria. In another example, validation device 170 may determine whether software and/or hardware included in user device 105 (as identified in the validation data) are compatible with the special handling associated with content 101.

As shown in FIG. 7, validation device 170 may generate an extension for (e.g., sign) the URL for content 101 (block 740) and may forward the extension to user device 105 (block 750). For example, validation device 170 may generate an extension identifying the special handling when user device 105 is eligible for the special handling, and otherwise, validation device 170 may return the original URL when user device 105 is not eligible for the special handling.

In one embodiment, validation device 170 may sign the network address for content 101 using cryptographic techniques to improve security by appending information to the original network address (e.g., the URL) based on one or more security credentials (e.g., a signing key identifier and/or a signing secret) associated with the special handling. For example, when the special handling relates to sponsored access to content 101, the signed URL address may contain special network destination information of the sponsored content, identifiers of various entities (e.g., a sponsor, a content provider, etc.), a security signature, and additional parameters that may be used in backend devices by the network provider for data accounting and billing processes.

In one embodiment, validation device 170 may sign the URL based on a keyed-hash message authentication code (HMAC) which is a process for calculating a message authentication code (MAC) involving a cryptographic hash function in combination with a secret cryptographic key. The HMAC process may be used to simultaneously verify both the data integrity and the authentication of a message. A cryptographic hash function, such as a fifth generation message digest (MD5) algorithm or a secure hash algorithm 1 (SHA-1), may be used in the calculation of an HMAC.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 3, 6, and 7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a processor included in a user device and from an application stored on the user device, a request to forward content to the user device, wherein the request includes a universal resource locator (URL) associated with the content;
   determining, by the processor included in the user device, whether the content is to be forwarded to the user device using special handling, wherein the special handling relates to sponsored access to the content via a service network;
   modifying, by the processor included in the user device and based on determining that the content is to be forwarded to the user device using the special handling, the URL to form a modified URL;
   forwarding, by the processor included in the user device and when the URL is modified, a validation request to a validation device, wherein the validation request includes a portion of the URL, wherein the validation device determines based on the validation request whether the user device is eligible to receive the content using the special handling, wherein the validation device appends the URL to add an extension regarding the special handling and forwards the appended URL to the user device when the user device is eligible to receive the content using the special handling, and wherein the appended URL identifies a sponsor to be billed for the sponsored access to the content;
   acquiring, by the processor included in the user device, the content without the special handling using the URL included in the request when the URL is not modified or when the validation device determines that the user device is not eligible to receive the content using the special handling; and
   using, by the processor included in the user device and when the validation device forwards the appended URL, the appended URL to acquire the content using the special handling.

2. The method of claim 1, wherein the special handling relates to routing the content through a specific node in a service network.

3. The method of claim 1, wherein modifying the URL includes replacing, in the URL, data identifying a transmission protocol with information marking the URL as being associated with the special handling.

4. The method of claim 1, wherein using the appended URL includes establishing a session based on the extension, wherein the user device obtains the content via the session.

5. The method of claim 1, wherein the validation request further includes data identifying the user device.

6. A user device comprising:
   a memory to store instructions, and
   a processor configured to execute one or more of the instructions to:
   receive, from an application stored on the user device, a request to forward content to the user device, wherein the request includes a universal resource locator (URL) associated with the content;
   determine whether the content is to be forwarded to the user device using special handling, wherein the special handling relates to sponsored access to the content via a service network;
   modify, based on determining that the content is to be forwarded to the user device using the special handling, the URL to form a modified URL;
   forward, when the URL is modified, a validation request to a validation device, wherein the validation request includes a portion of the URL, wherein the validation device determines based on the validation request whether the user device is eligible to receive the content using the special handling, wherein the validation device appends the URL to add an extension regarding the special handling and forwards the appended URL to the user device when the user device is eligible to receive the content using the special handling, and wherein the appended URL identifies a sponsor to be billed for the sponsored access to the content;
   acquire the content without the special handling using the URL included in the request when the URL is not modified or when the validation device determines that the user device is not eligible to receive the content using the special handling; and
   use, when the validation device forwards the appended URL, the appended URL to acquire the content using the special handling.

7. The user device of claim 6, wherein the processor is further configured to:
   determine whether a stored copy of the content is available on the user device; and
   determine whether the content is to be forwarded to the user device using special handling.

8. The user device of claim 6, wherein the special handling relates to routing the content through a specific node in a service network.

9. The user device of claim 6, wherein the processor, when modifying the URL, is further configured to replace, in the URL, data identifying a transmission protocol with information marking the URL as being associated with the special handling.

10. The user device of claim 6, wherein the processor, when using the appended URL, is further configured to:
    establish, based on the extension, a session that provides the special handling, and
    obtain the content via the session.

11. The user device of claim 6, wherein the validation request further includes data identifying the user device.

12. A non-transitory computer readable memory to store:
    one or more of instructions that cause a processor in a user device to:
    receive, from an application stored on the user device, a request to forward content to the user device, wherein the request includes a universal resource locator (URL) associated with the content;
    determine whether the content is to be forwarded to the user device using special handling, wherein the special handling relates to sponsored access to the content via a service network;
    modify, based on determining that the content is to be forwarded to the user device using the special handling, the URL to form a modified URL;
    forward, when the URL is modified, a validation request to a validation device, wherein the validation request includes a portion of the URL, wherein the validation device determines based on the validation request whether the user device is eligible to receive the content using the special handling, wherein the validation device appends the URL to add an extension regarding the special handling and forwards the appended URL to the user device when the user device is eligible to receive the content using the special handling, and wherein the appended URL identifies a sponsor to be billed for the sponsored access to the content;

acquire the content without the special handling using the URL included in the request when the URL is not modified or when the validation device determines that the user device is not eligible to receive the content using the special handling; and use, when the validation device forwards the appended URL, the appended URL to acquire the content using the special handling.

13. The non-transitory computer readable memory of claim 12, wherein the instructions further cause the processor to:

determine whether a stored copy of the content is available on the user device; and determine whether the content may be forwarded to the user device using special handling.

14. The non-transitory computer readable memory of claim 12, wherein the special handling relates to routing the content through a specific node in a service network.

15. The non-transitory computer readable memory of claim 12, wherein the instructions further cause the processor, when modifying the URL, to replace, in the URL, data identifying a transmission protocol with information marking the URL as being associated with the special handling.

16. The non-transitory computer readable memory of claim 12, wherein the instructions further cause the processor, when using the appended URL, to:

establish, based on the extension, a session that provides the special handling, and obtain the content via the session.

* * * * *